US005109747A

United States Patent [19]

Spuler

[11] Patent Number: 5,109,747

[45] Date of Patent: May 5, 1992

[54] PIEZOELECTRIC BRIDGE SOUND PICK-UP FOR STRING INSTRUMENTS

[76] Inventor: Rolf Spuler, Sennhofweg 35, 8405 Winterthur, Switzerland

[21] Appl. No.: 587,732

[22] Filed: Sep. 25, 1990

[30] Foreign Application Priority Data

Jan. 3, 1990 [CH] Switzerland ........................ 00001/90

[51] Int. Cl.⁵ ................................................ G01H 3/18

[52] U.S. Cl. ................................ 84/731; 84/DIG. 24

[58] Field of Search .......................... 84/731, DIG. 24

[56] References Cited

U.S. PATENT DOCUMENTS

| | | | |
|---|---|---|---|
| 3,154,701 | 10/1964 | Evans | 310/9.6 |
| 3,712,951 | 1/1973 | Rickard | 84/731 |
| 4,160,401 | 7/1979 | Tomioka | 84/1.16 |
| 4,189,969 | 2/1980 | Katayama et al. | 84/731 |
| 4,252,990 | 2/1981 | Sado | 174/52 R |
| 4,278,000 | 7/1981 | Saito et al. | 84/1.16 |
| 4,290,331 | 9/1981 | Izdebski | 84/1.14 |
| 4,378,721 | 4/1983 | Kaneko et al. | 84/1.14 |
| 4,380,357 | 4/1983 | Evans et al. | 339/17 CF |

*Primary Examiner*—Stanley J. Witkowski
*Attorney, Agent, or Firm*—Walter C. Farley

[57] ABSTRACT

A piezoelectric bridge sound pick-up string instruments has a separate subassembly for each string. Each subassembly has a metal base body (4) with a pocket (4.1) for a piezoelectric sensor element (7), a sensor holder (5) and a pressure piece (8). The pocket is at right angles to the string and is tilted in accordance with the string pressure direction. The sensor element is embedded in an electrically insulating holder, which has a break in its central area (6) and allows a certain deflection of the sensor element. To an electrode on the under surface of the sensor element is fitted a conductor (9) for passing out a signal with positive potential. On an opposite, upper electrode surface is provided a pressure piece with a semi-circular cross-section, which transfers by friction the alternating pressure of the string (14) and functions as an electrical connection of ground potential.

12 Claims, 1 Drawing Sheet

PIEZOELECTRIC BRIDGE SOUND PICK-UP FOR STRING INSTRUMENTS

FIELD OF THE INVENTION

The present invention relates to converters for converting string vibrations of a musical instrument into electrical signals and in particular a bridge sound pick-up with a bridge saddle-piece in direct contact with the string.

BACKGROUND OF THE INVENTION

The prior art discloses numerous sound pick-ups, which are embedded in an instrument bridge. For example, U.S. Pat. No. 4,189,969 discloses a pick-up structure with individually potted, piezoelectric sensor elements having a T-shaped slot for receiving interchangeable top elements in contact with the strings. German Patent No. 3,536,921 discloses an elongated, shielded structure of piezoelectric crystals, which are arranged within a nut portion. Various other constructions are disclosed in U.S. Pat. Nos. 3,154,701, 4,252,990, 4,278,000, 4,290,331, 4,378,721, 4,380,357, and 4,160,401, as well as German Patent 3,613,888.

The basic construction problem for any sound pick-up is to produce a true-to-nature signal and a good signal-to-noise ratio. This problem acquires special dimensions in a piezoelectric pick-up, because the latter is a so-called "contact" pick-up. The signal is produced by the direct action of pressure waves, which are transmitted by one or more piezoelectric crystal elements via a coupling structure such as the bridge nut. Thus, both the geometry and the mechanical-acoustic characteristics of the coupling structure become very important. Ideally, the transmission of the vibration energy of the string via the coupling structure to the sensor element should take place with maximum sound fidelity and high efficiency.

In practice it has been found that the known piezoelectric pick-ups do not completely satisfy these requirements as evidenced by the fact that each manufactured product has its "own sound". Often, for design reasons, deep resonances are filtered out, which leads to shrill sounds with over-accentuated and noisy string side-tones. Constructions with a pick-up unit for several strings together tend to transmit sound from the individual strings at different levels.

Modern electronic sound processing such as MIDI (Musical Instrument Digital Interface) or multi-channel sound recording requires from each string a separate signal with high cross talk attenuation (≧40 dB) with respect to the adjacent strings.

Additional problems are caused by the use of a pick-up in acoustic instruments. Even before reaching an adequate amplification level, feedback frequently occurs produced by the reactive excitation of the resonant cavity by the sound waves of the loudspeaker. Traditional and "exotic" string instruments, such as e.g. harps or the Chinese cheng require a mechanically separate pick-up subassembly for each string because the relevant string spacing varies from instrument to instrument.

SUMMARY OF THE INVENTION

An object of the present invention is to provide a piezoelectric bridge sound pick-up which ensures absolute sound fidelity compared with the original string sound and has superior characteristics with regards to side-tone attenuation, particularly the string sliding noise produced during playing, acoustic feedback and cross talk with adjacent strings, so as to offer additional possibilities of controlling novel, multi-channel musical electronics with a variety of instruments.

Research carried out on known pick-ups, as well as tests on our own prototypes, confirm the aforementioned vital function of the coupling structure as the transmitting means for string vibration energy. Such energy is to be transmitted as directly as possible through a frictional connection from the string to the sensor element and for this purpose a lightweight coupling structure is advantageous. It must be ensured that the coupling structure only transfers the vibration energy to the sensor element. Any vibration-transmitting contact with other components, such as e.g., a groove for the lateral guidance of the coupling structure, leads to a partial derivation or diversion of the vibration, which is equivalent to an acoustic filter for the sensor element and leads to corresponding sound falsifications. Increased feedback susceptibility and a reduction of efficiency has been noted.

Unlike most known bridge pick-ups, the present invention is based on the idea that a pick-up only requires that "pure" string vibrations to achieve an original true sound, because the vibrations are formed by the mechanical-acoustic characteristics of the instrument and therefore have most of the desirable character of the sound. Additional sound simulations, e.g., the emission or radiation behavior of the sound body, can be brought about electronically.

This idea is based both on our own findings and a publication in the AES Journal (Audio Engineer Society), 03/1982 dealing with the importance of detecting the "pure" string vibrations, accompanied by the logical exclusion of sound body reactions in order to achieve advantageous feedback and sound behavior. Particular significance is attached to the natural vibration behavior of the pick-up casing. A dimensionally stable and natural vibration-damped sensor holder is advantageous.

It is known that the pushing and pulling of a polarized, piezoelectric sensor element produces voltage at its electrodes. A combination of pushing and pulling constitutes bending, to which the piezoelectric sensor reacts more strongly. The invention makes use of this efficiency increase.

BRIEF DESCRIPTION OF THE DRAWINGS

The invention is described in greater detail hereinafter relative to a fundamental embodiment with a variant and the attached drawings, wherein.

DESCRIPTION OF THE PREFERRED EMBODIMENTS

Figure 1:
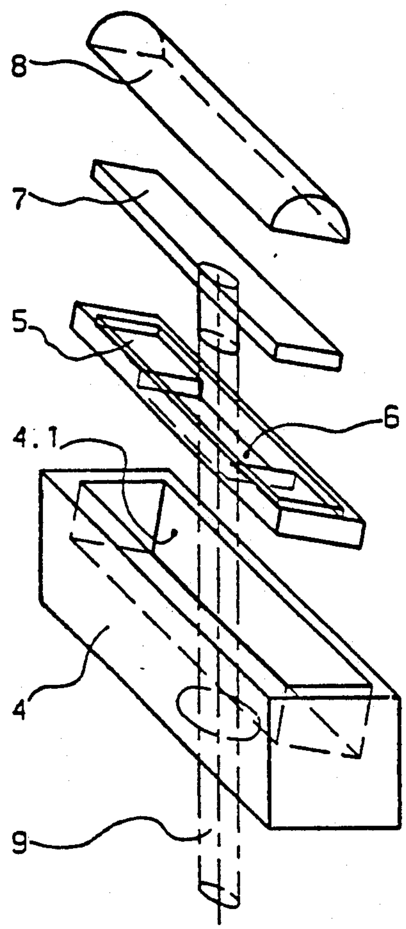
FIG. 1 is a perspective exploded view of a sound pick-up according to the invention.
Figure 2:
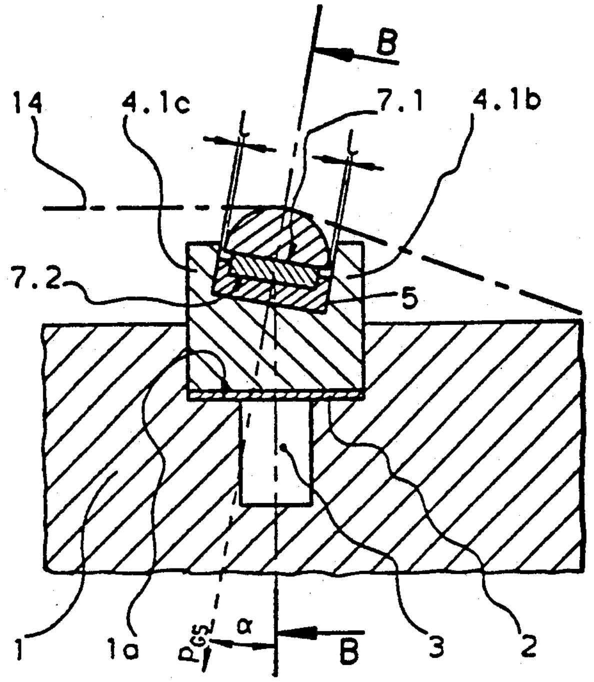
FIG. 2 is a cross-section along line A—A of FIG. 3.

The piezoelectric sound pick-up according to FIGS. 1 and 2 of a string instrument, only a portion of which is shown, is inserted in place of the bridge saddle element in a reception slot or groove or is simply placed on the top of the sound body 1. The bearing surface 1a of the slot is covered with an electrically conductive material, e.g., copper foil 2 and is provided with a hole and/or a channel 3 for the passage of the signal line 9. The support foil 2 is connected to ground potential (−) and contacts the underside of a metal base body 4 and forms a shield against electrical interference fields acting on a sensor element 7. Body 4 is preferably made of a copper-zinc alloy having a base 4*a* at least 2 mm thick.

Figure 3:
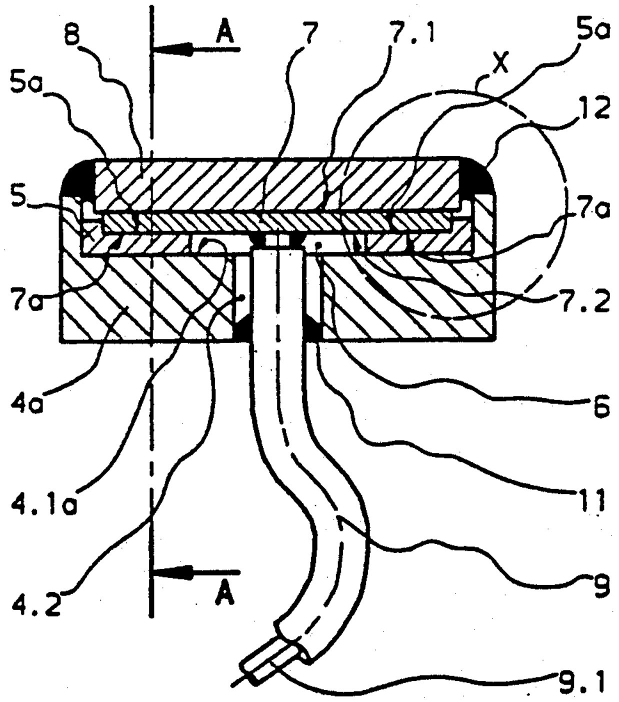
FIG. 3 is a longitudinal section along line B—B of FIG. 2.
Figure 4:
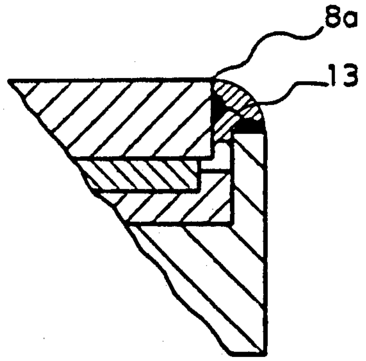
FIG. 4 is an enlarged view of detail X of FIG. 3 showing a variant of an electric contact system.

FIG. 3 illustrates the interaction of the individual components. Longitudinal bottom surface portions 7*a* of sensor element 7 rest on bearing faces 5*a* of a holder 5, to which it is fixed by means of cyanoacrylate adhesive. Holder 5 also passes around the side edges of sensor element 7 to roughly half its thickness and, as a result of the plastic construction of the holder, ensures reliable electrical insulation of the underside 7.2 of the sensor electrode (+ potential) from the base body 4. The alternating pressure Pgs of string 14 on sensor element 7 leads both to compressive and bending stress. The holder 5 rests non-positively, i.e., with frictional engagement only, on the base surface 4.1*a* of the pocket 4.1 and an opening 6 on its central region permits the direct application of an electrical conductor 9.1 to the lower electrode surface 7.2 of sensor element 7, preferably by soldering with low temperature solder. The insulated conductor 9 is led outwards through a hole 4.2 in the base body bottom 4*a* and is secured therein against tearing out by means of adhesive 11. Outside the pick-up, conductor 9, which is shielded against electrical interference fields, is led to an electrical preamplifier, positioned nearby, in order to reduce the impedance. On the upper electrode surface 7.1 rests the electrically conductive pressure piece 8, which functions as a connection to the string 14 which is at ground potential.

FIG. 2 illustrates the transfer by frictional contact of the alternating pressure Pgs of the string 14 to the sensor element 7, while maintaining an air gap L between the long sides of pressure piece 8 and the side walls 4.1*b*, 4.1*c* of the pocket 4.1, as well as the inclining of the pocket and the components 5,7 and 8 received therein in accordance with the angle $\alpha$ of the string pressure Pgs. In practice, said inclination forms an angle of 10° to the vertical. As shown in FIG. 3, the end faces 8*a*,8*b* of pressure piece 8 are fixed by means of semirigid synthetic resin adhesive 12 to the base body 4. In a further embodiment, the mechanical fixing and electrical connections are achieved with the same medium.

It is also pointed out that the conductive base body 4, together with the pressure piece 8 and the upper electrode surface 7.1, forms a Faraday cage, which shields the sensor element against external electrical or electromagnetic interference signals. A maximum scope of mechanical-acoustic use results from a construction with a separate subassembly for each string.

I claim:

1. A piezoelectric bridge sound pickup for a single strip of a string instrument comprising the combination of a metal base body supported on a surface of the instrument, said base body having a bottom wall of at least 2 mm thickness, said bottom wall having an upper support surface;

an electrically insulating holder supported by said support surface;

a piezoelectric element supported on said holder and insulated from said base body by said holder;

a pressure piece resting on said piezoelectric element between said piexoelectric element and said string so that said string passes over and contacts said pressure piece and exerts alternating forces along a line through said pressure piece as said string vibrates; and means between said pressure piece and said base body for elastically holding said pressure piece in position and for partially damping vibrations caused by said string, said upper support surface of said bottom wall being inclined relative to the surface of the instrument so as to lie in a plane substantially perpendicular to said line along which said string vibrates.

2. A sound pickup according to claim 1 wherein said means for elastically holding includes a synthetic resin adhesive.

3. A sound pickup according to claim 1 wherein the surface of said pressure piece contacting said string has a semicircular cross section.

4. A sound pickup according to claim 3 wherein said pressure piece is made of a material having a hardness HRc of 22±2 and a bending moment Mbmax of 172±2 cmN.

5. A sound pickup according to claim 1 wherein said pressure piece is made of a material having a hardness HRc of 22±2 and a bending moment Mbmax of 172±2 cmN.

6. A sound pickup according to claim 1 wherein said pressure piece is electrically conductive and comprises, with a metal string, a negative connection to said piezoelectric element.

7. A sound pickup according to claim 6 wherein said pressure piece is made of a copper-nickel alloy and is connected electrically to said base body.

8. A sound pickup according to claim 7 wherein said means for elastically holding comprises and electrically conductive synthetic adhesive.

9. A sound pickup according to claim 1 wherein said pressure piece is made of a copper-nickel alloy.

10. A sound pickup according to claim 1 wherein said electrically insulating holder is made of a rigid thermoplastic material and is shaped to support said piezoelectric element at spaced end portions thereof.

11. A sound pickup according to claim 1 wherein said upper support surface is inclined at an angle of 10°.

12. A piezoelectric bridge sound pickup for a single string of a string instrument comprising the combination of an elongated metal base body supported on a surface of the instrument at a location on the instrument normally occupied by a bridge, said base body having a bottom wall of sufficient thickness to render said body substantially torsionally rigid, said base body having means defining an elongated cavity therein extending transversely of said string and opening away from said surface of said instrument, said bottom wall having an upper support surface at the bottom of said cavity;

an electrically insulating holder in said cavity resting on said support surface, said holder having spaced support portions at opposite ends of said cavity and at opposite sides of a plane passing through the center of said cavity and containing said single string;

an elongated piezoelectric element in said cavity supported at opposite ends by said support portions of said holder and electrically insulated from said base body by said holder;

an elongated pressure piece frictionally engaging said piezoelectric element between said piexoelectric element and said single string and extending transversely of said single string so that said string passes over and contacts said pressure piece and exerts alternating forces along a line in said center plane and through said pressure piece as said string vibrates; and means between ends of said pressure piece and said base body for elastically holding said ends of said pressure piece in position and for partially damping vibrations caused by said string, said upper support surface of said bottom wall being inclined relative to the surface of the instrument so as to lie in a plane substantially perpendicular to said line along which said string vibrates.

* * * * *